(12) United States Patent
Knorr et al.

(10) Patent No.: US 11,597,151 B2
(45) Date of Patent: Mar. 7, 2023

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Florian Knorr, Lichtenfels (DE); Christoph Tietjen, Osterholz-Schambeck (DE)

(73) Assignee: CONCEPT LASER GMBH, Lichtenfels (DE)

( * ) Notice: Subject to any disclaimer, the term of this patent is extended or adjusted under 35 U.S.C. 154(b) by 1039 days.

(21) Appl. No.: 16/290,958

(22) Filed: Mar. 3, 2019

(65) Prior Publication Data
US 2020/0055253 A1    Feb. 20, 2020

(30) Foreign Application Priority Data

Aug. 15, 2018  (EP) ..................... 18189184

(51) Int. Cl.
*B29C 64/393* (2017.01)
*B22F 10/20* (2021.01)
(Continued)

(52) U.S. Cl.
CPC ............ *B29C 64/393* (2017.08); *B22F 10/20* (2021.01); *B29C 64/153* (2017.08); *B29C 64/268* (2017.08); *B22F 10/30* (2021.01); *B22F 2201/11* (2013.01); *B29C 64/371* (2017.08); *B33Y 10/00* (2014.12); *B33Y 30/00* (2014.12); *B33Y 50/02* (2014.12)

(58) Field of Classification Search
CPC ... B29C 64/393; B29C 64/153; B29C 64/268; B29C 64/371; B22F 10/20; B22F 10/30; B33Y 10/00; B33Y 30/00; B33Y 50/02; Y02P 10/25

USPC ......................................................... 700/105
See application file for complete search history.

(56) References Cited

U.S. PATENT DOCUMENTS

| 5,427,733 A * | 6/1995 | Benda ................... | B33Y 10/00 419/10 |
| 2018/0186067 A1 * | 7/2018 | Buller ................... | B23K 26/34 |

FOREIGN PATENT DOCUMENTS

WO    2018086996 A1    5/2018

OTHER PUBLICATIONS

European Search Report Corresponding to Application No. 18189184 dated Jan. 30, 2019.

* cited by examiner

*Primary Examiner* — Michael J Brown
(74) *Attorney, Agent, or Firm* — Dority & Manning, P.A.

(57) ABSTRACT

Apparatus for additively manufacturing three-dimensional objects by means of successive layerwise selective irradiation and consolidation of layers of a build material which can be consolidated using at least one energy beam, wherein an irradiation device is adapted to generate and guide the energy beam to at least one position of a build plane, wherein a determination unit is adapted to determine at least one parameter of radiation propagating in a process chamber of the apparatus, wherein a calibration element is arrangeable or arranged in the process chamber, wherein the calibration element comprises at least one calibration section that is adapted to emit measurement radiation upon irradiation with the or an energy beam and in that the determination unit is adapted to detect the measurement radiation, wherein a control unit is adapted to calibrate the irradiation device.

20 Claims, 2 Drawing Sheets

(51) Int. Cl.
  *B29C 64/153* (2017.01)
  *B29C 64/268* (2017.01)
  *B33Y 50/02* (2015.01)
  *B33Y 10/00* (2015.01)
  *B33Y 30/00* (2015.01)
  *B29C 64/371* (2017.01)
  *B22F 10/30* (2021.01)

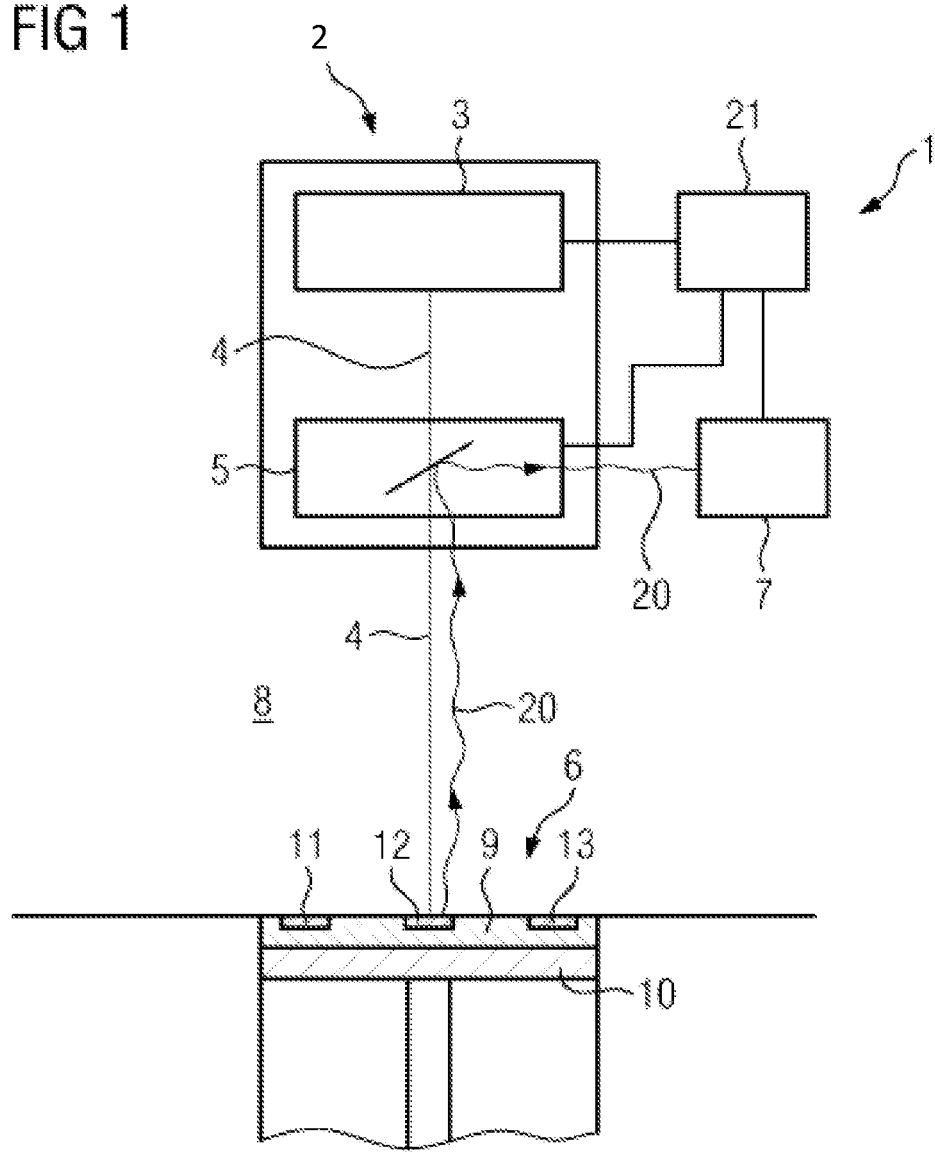

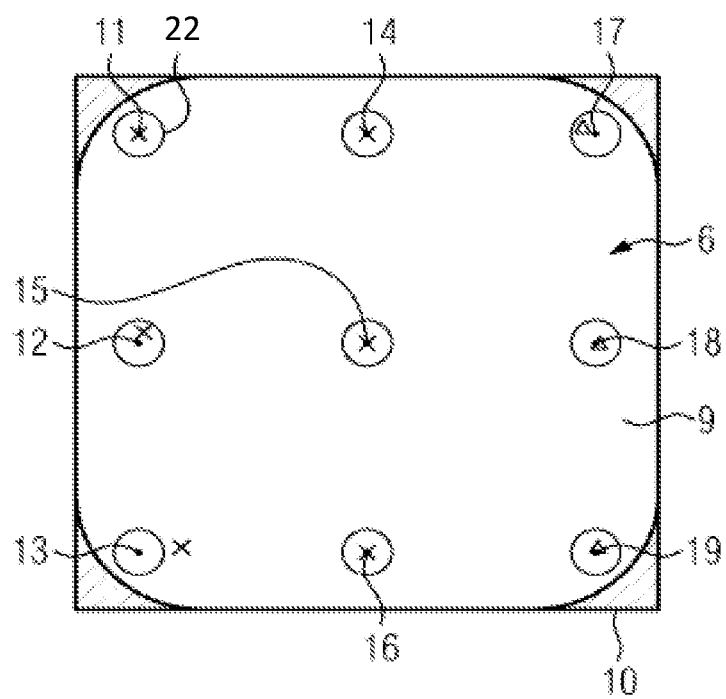

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 189 184.7 filed Aug. 15, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of at least one energy beam, wherein an irradiation device is adapted to generate and guide the energy beam to at least one position of a build plane, wherein a determination unit is adapted to determine at least one parameter of radiation propagating in a process chamber of the apparatus.

Apparatuses for additively manufacturing of three-dimensional objects using energy beams to selectively irradiate and thereby consolidate layers of a build material are generally known from prior art. Corresponding apparatuses usually comprise irradiation devices that are adapted to generate and guide the energy beam to selectively irradiate the build material arranged in a build plane corresponding to geometrical data of the object to be built.

Further, it is known from prior art that parameters of the radiation propagating inside the process chamber of the apparatus, i.e. the chamber in which the additive manufacturing process is performed, can be determined to gain information on the process quality and/or the object quality in additive manufacturing processes. Thus, it is possible to determine parameters of radiation inside the process chamber, such as parameters of an energy beam or parameters of radiation that is generated in the additive manufacturing process, such as thermal radiation that is emitted from the build plane due to the energy beam heating the build material.

Hence, apparatuses are known that comprise determination units that are adapted to determine parameters of the radiation inside the process chamber, such as determining the intensity of thermal radiation or the intensity and/or the position of the energy beam on the build plane, in particular throughout the additive manufacturing process. It is also possible to irradiate defined irradiation patterns on test specimen, such as (metal) sheets which can be analyzed to verify whether the energy beam is properly calibrated.

It is an object of the present invention to provide an apparatus for additively manufacturing of three-dimensional objects, wherein the calibration of the energy beam, in particular the calibration of the irradiation device, is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance.

The apparatus may comprise a number of functional units which are used during its operation. Exemplary functional units are a process chamber, an irradiation device, as described before, which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to the calibration of an apparatus for additively manufacturing three-dimensional objects, in particular the calibration of an irradiation device generating an energy beam. The invention is based on the idea that a calibration element is arranged or can be arranged in the process chamber of the apparatus, wherein the calibration element comprises at least one calibration section that is adapted to emit measurement radiation upon irradiation with the or an energy beam and in that the determination unit is adapted to detect the measurement radiation, wherein a control unit is adapted to calibrate the irradiation device dependent on the detection of the measurement radiation emitted by the at least one calibration section.

Therefore, the invention suggests using a calibration element to generate measurement radiation which may form the basis of the calibration process. The calibration element comprises at least one calibration section which emits measurement radiation, if it is irradiated with the energy beam that is used to irradiate build material in an actual additive manufacturing process or another energy beam, for example an energy beam that is exclusively used for the calibration process. The measurement radiation that is generated upon the irradiation with the or an energy beam (in the following "the energy beam") can be detected with a determination unit. As determination unit a separate determination unit may be used that is provided for performing the calibration process or it is possible to use a determination unit that is provided with the apparatus, for example a determination unit adapted to determine a parameter of the energy beam and/or radiation propagating inside the process chamber of the apparatus, e.g. during an additive manufacturing process.

Hence, the calibration process can be performed by irradiating the calibration element, wherein measurement radiation is generated and emitted, if the energy beam is incident on the at least one calibration section of the calibration element. The emitted measurement radiation can be detected via the determination unit. Dependent on the detection of the measurement radiation a control unit is then adapted to calibrate the irradiation device. In other words, the measurement radiation is generated in the at least one calibration section and emitted from the calibration section, only if the energy beam is incident on the calibration section.

Thus, the generation of and the emission of the measurement radiation is connected with the energy beam being guided onto the calibration section. Thus, there is a connection can between the lateral position of the energy beam and the emission of measurement radiation. For example, if a calibration section of the calibration element emits measurement radiation, the conclusion can be made that the energy beam is incident on the calibration section. Thus, the control unit may calibrate the irradiation device dependent on the detected measurement radiation. Thus, the lateral position of the energy beam can be calibrated to the position of the calibration section, as the energy beam is incident on the calibration section, since the measurement radiation has been generated and emitted. In other words, it can be verified that the energy beam is actually guided to the calibration section by detecting the measurement radiation.

Additionally, it is possible to define a maximum deviation that is tolerated, wherein the energy beam being incident on the calibration element within the maximum deviation, for example a radius around the nominal position on the calibration element, measurement radiation is generated. Thus, time can be saved, as the energy beam does not perfectly have to be incident on the calibration section, for example in one position on the calibration element, but it is sufficient, if the energy beam is incident on the calibration element within the defined maximum deviation.

Preferably, the control unit may be adapted to store at least one position of the at least one energy beam in the build plane dependent on the detection of measurement radiation. This allows for detecting the measurement radiation and storing the actual position of the energy beam in the build plane to connect the actual position with the detection of the measurement radiation. Thus, it is possible to guide the energy beam over the build plane and store the position of the energy beam in the build plane, if measurement radiation is detected via the determination unit. As the positions of the calibration sections of the calibration element are known and well-defined, the actual position of the energy beam (identified by the detection of measurement radiation) can be compared with the nominal position of the energy beam and therefore, calibration data can be generated based on a deviation of the actual position of the energy beam from a nominal position.

It is particularly possible that the energy beam may be guided to a nominal position in which the energy beam should be incident on a calibration section. If no measurement radiation is generated in the actual position of the energy beam, a calibration of the irradiation device may be deemed necessary.

According to another embodiment of the inventive apparatus, the control unit may be adapted to assign the detection of measurement radiation to a specific calibration section of the calibration element. Thus, if the energy beam is guided onto the build plane, in particular onto the calibration element that is arranged in the build plane, measurement radiation is emitted by at least one calibration section of the calibration element with the energy beam being incident on the specific calibration element.

Thus, the calibration unit may assign the detection of measurement radiation to the specific calibration section of the calibration element that emitted the measurement radiation upon the irradiation with the energy beam. The assignment of the specific calibration section to the event of generating and emitting the measurement radiation may be performed, e.g. by assigning the nearest calibration section, for example using a spatially resolving detector. Alternatively, if a detector is used that merely may detect whether measurement radiation is emitted or not, the calibration section is assigned that is closest to the actual position of the energy beam. Of course the described modes of performing the assignment process are only exemplary and any other arbitrary assignment of the calibration section to the detected measurement radiation can also be performed.

The control unit of the inventive apparatus may further be adapted to correlate the detection of the measurement radiation with the position, in particular a nominal position, of the energy beam in the build plane of the process chamber. According to this embodiment of the inventive apparatus, the position of the energy beam in the build plate may be correlated to the detection of the measurement radiation, wherein in particular the nominal position of the energy beam may be compared to the actual position of the energy beam in the build plane. Hence, the energy beam may be guided to a position in the build plane or may be scanned over the build plane, wherein measurement radiation will be emitted, if the energy beam is incident on the calibration section of the calibration element, which is arranged in the build plane during the calibration/determination process.

Upon the detection of measurement radiation, the actual position of the energy beam can be stored, as described before. If the energy beam is guided to a nominal position of the build plane, for example the position of the calibration section, and no measurement radiation is emitted and therefore, no measurement radiation is detected via the determination unit, the actual position of the energy beam deviates from the nominal position and the calibration of the energy beam and a calibration of the irradiation device is necessary. If, for example the energy beam is guided to a nominal position in which no calibration section is arranged and measurement radiation is detected, then the energy beam is actually incident on a calibration section of the calibration element, wherein for example the closest position of a calibration section may be stored as nominal value for the actual position.

Thus, the control unit may correlate the actual position to the nominal position, in which the corresponding calibration section is arranged. Thus, the irradiation device can be calibrated in that the deviation between the actual position and the nominal position can be compensated to ensure that the energy beam being guided to the nominal position is incident on the calibration section arranged in the nominal position. The calibration can be verified by guiding the energy beam to the nominal position of the calibration section again. If measurement radiation is detected, then the calibration was successful.

The inventive apparatus may further be improved in that the calibration element comprises at least two, in particular multiple, calibration sections. According to this embodiment, the calibration process can be performed for multiple positions (at least two positions), since the calibration element comprises at least two calibration sections onto which the at least one energy beam can be guided. Thus, it is possible to guide the energy beam on a first calibration section and verify, whether measurement radiation is generated and emitted from the corresponding calibration section. Subsequently, the energy beam may be guided onto a second calibration section and it can be verified, whether measurement radiation is generated and emitted from the second calibration section and so on. Hence, it is possible to verify, whether the energy beam is properly guided in multiple sections of the calibration element and therefore, in multiple sections of the build plane, since in the measurement process the calibration element may be arranged in the build plane, as described before.

The calibration element of the inventive apparatus may further comprise multiple calibration sections that are arranged on the calibration element in a defined pattern, in particular in a grid. The energy beam may therefore, be guided along the defined pattern the multiple calibrations sections are arranged in to perform the calibration process.

The single calibration sections comprised in the defined pattern may represent coordinates from a coordinate system, such as an x- and y-coordinate system arranged in the build plane, for instance. Hence, the energy beam may be scanned along the calibration sections of the defined pattern, in particular of the grid, wherein each calibration section emits measurement radiation upon the energy beam being incident on the calibration section.

Thus, it can be verified, whether the energy beam is properly guided and calibrated, if all calibration sections emit measurement radiation upon the corresponding irradiation with the energy beam. If a calibration section does not emit measurement radiation, the energy beam is not incident on the corresponding calibration section and therefore, the energy beam is not properly calibrated and/or properly guided and a recalibration process may be deemed necessary.

Further, the beam guiding unit of the inventive apparatus may be adapted to generate a relative movement between the calibration element and the at least one energy beam. The relative movement may be generated by moving the energy beam relative to the calibration element or by moving the calibration element relative to the energy beam. Of course, a combination of both movements is also feasible, in which the energy beam and the calibration element are moved relative to a static portion of the apparatus. Due to the relative movement of the energy beam on the calibration element, it is possible to position the energy beam in the different calibrations sections of the calibration element.

The calibration element may preferably be built as a plate or a stencil. In particular, the calibration element may be manufactured with a defined precision, in particular a high precision, to ensure that the calibration element can be properly arranged in a defined position inside the process chamber, in particular in the build plane of the apparatus. The calibration element may, for example, be arranged on a build plate of the apparatus, which usually carries the powder bed and/or the object to be built in a regular additive manufacturing process. The build plate may be lowered in that the surface of the calibration element comprising the calibration sections is arranged in the build plane to perform the calibration process. It is also possible that the calibration element matches the size of the build plate/build plane.

According to another embodiment of the inventive apparatus, at least one calibration section may be adapted to emit measurement radiation passively or actively, in particular via luminescence, preferably fluorescence and/or phosphorescence and/or reflection and/or active emission of radiation. The calibration section may comprise or may be built as a coating on the calibration element which is adapted to emit the measurement radiation. The calibration section may further be built as a separate emission member that can be separably connected to the calibration element. In particular, at least one calibration section may comprise a light source, in particular a separate light source, that is adapted to actively emit measurement radiation, if the energy beam is incident on the corresponding calibration section. Hence, it is arbitrary how the measurement radiation is generated. It has to be assured that measurement radiation is generated, if the energy beam is incident on the corresponding calibration section.

The irradiation device of the inventive apparatus may be adapted to generate at least two energy beams, wherein different or the same measurement radiation is emitted by the at least one calibration section upon irradiation. According to this embodiment, at least two energy beams may be generated via the irradiation device and can be guided onto the calibration element. Upon the irradiation with the different energy beams, the calibration sections of the calibration element may emit measurement radiation, wherein the measurement radiation may be the same or different measurement radiation, for example the same or different wavelengths and/or intensities and/or type of signal.

The beam guiding unit of the inventive apparatus may further be adapted to scan the at least one energy beam of at least one part of the calibration element, in particular the entire calibration element. Thus, the at least one energy beam may be scanned over the calibration element, in particular into the single positions in which the single calibration sections are arranged. As described before, the calibration element may preferably extend in the (entire) build plane, to verify whether the energy beam is properly guided and calibrated in defined sections of the build plane. Preferably, the different calibration sections of the calibration element are arranged in that with the calibration element in the measurement position, every calibration section is assigned to a section of the build plane.

By scanning the at least one energy beam over the at least one part of the calibration element, it can be identified in which actual position of the energy beam on the calibration element the measurement radiation is generated. For example, if the energy beam is not properly guided or calibrated, and thus, in the nominal position in which a calibration section of the calibration element should be arranged, no measurement radiation is generated, it can be identified by scanning the energy beam over the corresponding part of the calibration element, in which actual position the measurement radiation is generated. Therefore, a relation between the actual position of the energy beam in which measurement radiation is generated and the nominal position, in which the energy beam should be incident on the calibration section, can be established.

According to another embodiment of the inventive apparatus, the beam guiding unit may be adapted to scan at least two energy beams simultaneously over the at least one part or over different parts of the calibration element. As described before, upon the irradiation with different energy beams, different measurement radiation can be generated or the same measurement radiation can be generated. Thus, it is possible to guide the energy beams in different parts of the calibration element, for example along a predefined pattern or a predefined grid.

Besides, the invention relates to a calibration element for an apparatus for additively manufacturing of three-dimensional objects by means of successive layerwise selective irradiation and consolidation of layers of a build material which can be consolidated by means of at least one energy beam, wherein an irradiation device is adapted to generate and guide the energy beam to at least one position of a build plane, wherein a determination unit is adapted to determine at least one parameter of radiation propagating in a process chamber of the apparatus, in particular for an inventive apparatus, as described before, wherein the calibration element is arrangeable or arranged in the process chamber, wherein the calibration element comprises at least one calibration section that is adapted to emit measurement radiation upon irradiation with the or an energy beam and in that the determination unit is adapted to detect the measurement radiation, wherein a control unit is adapted to calibrate the irradiation device dependent on the detection of the measurement radiation emitted by the at least one calibration section.

The calibration element may also be deemed as calibration body that can be inserted into the process chamber of the apparatus, in particular arranged in the build plane of the apparatus, for example on a build plate, as described before. Thus, the calibration element can be inserted into the process chamber of the apparatus to perform the calibration process and can be removed afterwards. The calibration element can be standardized to be used in multiple different apparatuses, wherein the pattern in which the calibration sections are arranged may be standardized as well.

Further, the invention relates to a method for calibrating at least one apparatus for additively manufacturing three-dimensional objects by means of successive layerwise selective irradiation and consolidation of layers of a build material which can be consolidated by means of an energy source, in particular for an inventive apparatus, as described before, wherein a calibration element is arranged in a process chamber of the apparatus, wherein the calibration element comprises at least one calibration section that is adapted to emit measurement radiation upon irradiation with the or an energy beam and in that the determination unit is adapted to detect the measurement radiation, wherein the irradiation device is calibrated dependent on the detection of the measurement radiation emitted by the at least one calibration section.

Self-evidently, all features, details and advantages described with respect to the inventive apparatus are fully transferable to the inventive calibration element and the inventive method. In particular, the inventive method may be performed on the inventive apparatus, preferably using an inventive calibration element.

Exemplary embodiments of the invention are described with reference to the Fig. The Fig. are schematic diagrams, wherein FIG. 1 shows an inventive apparatus with an inventive calibration element; and FIG. 2 shows an inventive calibration element.

FIG. 1 shows an apparatus 1 for additively manufacturing three-dimensional objects by means of successive layerwise selective irradiation and consolidation of layers of a build material which can be consolidated. The apparatus 1 comprises an irradiation device 2, comprising an irradiation unit 3 that is adapted to generate an energy beam 4, such as a laser beam or an electron beam. The energy beam 4 may be guided via a beam guiding unit 5 that can also be considered as part of the irradiation device 2. The beam guiding unit 5 is adapted to generate a relative movement between the energy beam 4 and a build plane 6, in particular to scan the energy beam 4 over the build plane 6. Of course, it is also possible to move the build plane 6 relative to a static energy beam 4.

The apparatus 1 further comprises a determination unit 7 that is adapted to determine at least one parameter of radiation propagating in a process chamber 8 of the apparatus 1. The process chamber 8 is the chamber in which the additive manufacturing process takes place.

As can further be derived from FIG. 1, a calibration element 9 is arranged in the build plane 6, in particular the calibration element 9 is arranged on a carrying element 10. In additive manufacturing processes performed with the apparatus 1, the carrying element 10 carries a volume of (powdery) build material that can be selectively consolidated via the energy beam 4. The calibration element 9 comprises multiple calibration sections 11-19 (FIG. 2).

As the energy beam 4 is guided on the carrying element 9 that is arranged in the build plane 6, the energy beam 4 may be incident on the calibration sections 11-19. Upon the irradiation with the energy beam 4 or with the energy beam 4 being incident on one of the calibration sections 11-19, the corresponding calibration section 11-19 emits measurement radiation 20 that can be detected via the determination unit 7. In other words, if the energy beam 4 is incident on one of the calibration sections 11-19, the calibration section 11-19 the energy beam 4 is incident on, generates and emits measurement radiation 20 which can be detected via the determination unit 7.

The apparatus 1 further comprises a control unit 21 that is adapted to store at least one position of the energy beam 4 in the build plane 6 dependent on the detection of measurement radiation 20 via the determination unit 7. Thus, if measurement radiation 20 is detected via the determination unit 7, the actual position of the energy beam 4 in the build plane 6 may be stored via the control unit 21. The control unit 21 my further assign the detection of measurement radiation 20 to a specific calibration section 11-19 of the calibration element 9. Thus, if measurement radiation 20 is detected, the control unit 21 may assign the generation of measurement radiation 20 to the calibration section 11-19 that is closest to the actual position of the energy beam 4, for instance. It is also possible to have the determination unit 7 spatially resolve the build plane 6 and therefore, the control unit 21 may directly identify the calibration section 11-19 that emitted the measurement radiation 20.

Thus, the detection of measurement radiation 20 may be correlated with the actual position of the energy beam 4 in the build plane 6 of the process chamber 8. In other words, the energy beam 4 may be guided via the beam guiding unit 5 to a nominal position in which a calibration section 11-19 is arranged. If measurement radiation 20 is emitted from the corresponding calibration section 11-19, it can be verified that the energy beam 4 is properly calibrated, in particular properly guided via the beam guiding unit 5.

The control unit 21 my further calibrate the beam guiding unit 5, wherein dependent on the detection of the measurement radiation 20 the position of the at least one calibration section 11-19, in particular the actual position of the at least one energy beam 4, can be stored as nominal position for the position of the at least one calibration section 11-19 in the build plane 6. Hence, the energy beam 4 may be scanned over the calibration element 9 and the position of the energy beam 4 in which measurement radiation 20 is detected for the corresponding calibration section 11-19 can be stored as nominal position for the corresponding calibration section 11-19. Thus, the nominal positions, as defined by the calibration sections 11-19, can be identified and stored.

As can be derived from FIG. 2, the calibration element 9 comprises multiple calibration sections 11-19, that are arranged in a defined pattern, in particular as a grid. Of course, the number of calibration sections 11-19 is merely exemplary and any arbitrary number of calibration sections 11-19 can be arranged on the calibration element 9, in particular a larger number than in this exemplary embodiment.

The calibration element 9 in this exemplary embodiment is built as a (high position manufactured) plate, for example made from metal. The calibration element 9 may be arranged in the build plane 6, as depicted in FIG. 1. After the calibration process is performed, the calibration element 9 can be removed from the process chamber 8 of the apparatus 1.

The calibration sections 11-19 are adapted in this exemplary embodiment to emit measurement radiation 20 via luminescence, preferably fluorescence. Of course, any other arbitrary way to generate measurement radiation 20 is also feasible, in particular passive or active generation of measurement radiation 20, for example via phosphorescence and/or reflection and/or active emission of radiation, for example via a light source, such as a light emitting diode (LED). Each calibration section 11-19 may comprise a detector and a measurement radiation source, wherein the measurement radiation source emits measurement radiation 20, if the energy beam 4 is incident on the detector (not shown).

The calibration sections 11-19 may be built as a coating on top of the calibration element 9, wherein it is of course also possible to have separate emission members adapted to generate measurement radiation 20 upon irradiation with the energy beam 4. Mentioned emission members may be separably detachable and attachable to the calibration element 9. For example, it is possible to choose from different emission members dependent on the energy beam 4 that is used, for example dependent on the wavelength and/or the intensity of the energy beam 4.

As can further be derived from FIG. 2, a maximum tolerance 22 (depicted as circle around the calibration sections 11-19) is defined. The corresponding calibration section 11-19 will generate measurement radiation 20 upon irradiation with the energy beam 4, if the energy beam 4 is incident within the maximum tolerance 22 around the corresponding calibration section 11-19. In this exemplary embodiment the energy beam 4 being incident on the calibration sections 11-16 is indicated via an "X". Thus, the energy beam 4 incident on the calibration sections 11, 12 and 14-16 will generate measurement radiation 20, as the energy beam 4 is guided inside the maximum tolerance 22.

In particular, the energy beam 4 incident on the calibration sections 11 and 14-16 is incident on the nominal position. The energy beam 4 incident on the calibration section 12 deviates from the nominal position but is incident within the maximum tolerance 22. The energy beam 4 incident on the calibration section 13 deviates from the nominal position more than the maximum tolerance 22 therefore, no measurement radiation 20 is generated via the calibration section 13.

Of course, the energy beam 4 can be scanned over the calibration element 9 in that the energy beam 4 is guided over the single calibration sections 11-19 in succession. As indicated via a triangular shape, another energy beam 4 may be scanned over the calibration element 9, for example the calibration sections 17-19. As indicated in FIG. 2, the second energy beam 4 is incident on the calibration sections 18, 19 and hits the nominal position. The second energy beam 4 is incident on the calibration section 17, but deviates from the nominal position less than the maximum tolerance 22. Dependent on with which energy beam 4 the calibration sections 11-19 are irradiated, it is possible that the calibration sections 11-19 emit radiation with different wavelengths/intensities/types of signal or the same wavelength/intensity/type of signal.

By scanning two energy beams 4 over the calibration element 9, it is possible to scan the energy beams 4 along a defined scan path, for example the first energy beam 4 starting with the calibration sections 11, 12 and 13, wherein the second energy beam 4 starts with irradiating the calibration sections 17, 18, 19. Besides using a spatially resolving determination unit 7, it is also possible to merely use a determination unit 7 that is adapted to detect the measurement radiation 20. In other words, the determination unit 7 can be built simple by merely providing the ability to detect whether measurement radiation 20 is generated or not. Thus, if the energy beam 4 is guided to a nominal position in which a calibration section 11-19 is arranged, and measurement radiation is detected, it is verified, that the energy beam 4 is incident on the nominal position (or at least within an maximum tolerance 22 deviating from the nominal position).

It is also possible to scan the energy beam 4 and detect in which actual positions measurement radiation 20 is detected and therefore, compare the actual position in which measurement radiation 20 is detected with the nominal position in which measurement radiation 20 should be detected. Deviations between the nominal position and the actual position can afterwards be compensated accordingly.

Of course, the inventive method can be performed on the inventive apparatus 1, preferably using the inventive calibration element 9.

The invention claimed is:

1. An apparatus for additively manufacturing three-dimensional objects by successive layerwise selective irradiation and consolidation of layers of a build material in a build plane, the apparatus comprising:
    an irradiation device adapted to generate at least two energy beams, wherein the at least two energy beams have different wavelengths and/or intensities;
    a calibration element in a process chamber of the apparatus, wherein the calibration element comprises at least one calibration section that emits measurement radiation when irradiated by the at least two energy beams;
    a determination unit that detects the measurement radiation; and
    a control unit adapted to calibrate the irradiation device dependent on the detection of the measurement radiation.

2. The apparatus of claim 1, wherein the control unit stores at least one position of the at least one energy beam in the build plane dependent on the detection of measurement radiation.

3. The apparatus of claim 1, wherein the control unit is adapted to assign the detection of measurement radiation to a specific calibration section of the calibration element.

4. The apparatus of claim 1, wherein the control unit is adapted to correlate the detection of the measurement radiation with the position of the energy beam in the build plane of the process chamber.

5. The apparatus of claim 1, wherein the control unit is adapted to calibrate a beam guiding unit of the apparatus, wherein dependent on the detection of the measurement radiation the position of the at least one calibration section is stored as nominal position for the position of the at least one calibration section in the build plane.

6. The apparatus of claim 5, wherein the beam guiding unit is adapted to generate a relative movement between the calibration element and the at least two energy beams.

7. The apparatus of claim 5, wherein the beam guiding unit is adapted to scan the at least two energy beams over at least one part of the calibration element.

8. The apparatus of claim 5, wherein the beam guiding unit is adapted to scan the at least two energy beams simultaneously over the at least one part or over different parts of the calibration element.

9. The apparatus of claim 1, wherein the calibration element comprises at least two calibration sections.

10. The apparatus of claim 9, wherein the at least two calibration sections are arranged on the calibration element in a defined pattern.

11. The apparatus of claim 1, wherein the calibration element is a plate or a stencil.

12. The apparatus of claim 1, wherein the at least one calibration section is adapted to emit the measurement radiation via luminescence.

13. The apparatus of claim 1, wherein different measurement radiation is emitted by the at least one calibration section upon irradiation.

14. A method for calibrating an apparatus for additively manufacturing three-dimensional objects by successive layerwise selective irradiation and consolidation of layers of a build material in a build plane, the method comprising:
- generating at least two energy beams from an irradiation device, wherein the at least two energy beams have different wavelengths and/or intensities;
- irradiating a calibration element in a process chamber of the apparatus with the at least two energy beams, wherein the calibration element comprises at least one calibration section that emits measurement radiation when irradiated by the at least two energy beams;
- detecting the measurement radiation via a determination unit; and
- calibrating the irradiation device dependent on the detection of the measurement radiation via a control unit.

15. The method of claim 14, further comprising storing at least one position of the at least two energy beams in the build plane dependent on the detection of measurement radiation.

16. The method of claim 14, further comprising assigning the detection of measurement radiation to a specific calibration section of the calibration element.

17. The method of claim 14, further comprising correlating the detection of the measurement radiation with the position of the at last two energy beams in the build plane of the process chamber.

18. The method of claim 14, wherein the control unit is adapted to calibrate a beam guiding unit of the apparatus, wherein dependent on the detection of the measurement radiation the position of the at least one calibration section is stored as nominal position for the position of the at least one calibration section in the build plane.

19. The method of claim 14, wherein the calibration element comprises at least two calibration sections.

20. The method of claim 14, wherein the beam guiding unit is adapted to scan the at least two energy beams over at least one part of the calibration element.

* * * * *